United States Patent [19]

Whatcott et al.

[11] Patent Number: 5,637,144
[45] Date of Patent: Jun. 10, 1997

[54] ASBESTOS REPLACER

[76] Inventors: Burton K. Whatcott, P.O. Box 863, Dolores, Colo. 81323; Lynn G. Bigelow, 1359 N. 25th St., Mesa, Ariz. 85213

[21] Appl. No.: 461,535

[22] Filed: Jun. 5, 1995

[51] Int. Cl.$^6$ ............................... C04B 14/10; C04B 7/02
[52] U.S. Cl. ..................... 106/718; 106/719; 106/720; 106/721; 106/803; 106/811; 106/812; 106/819; 106/823; 106/486; 106/487; 106/DIG. 4
[58] Field of Search ................................. 106/718, 719, 106/720, 721, DIG. 4, 803, 486, 487, 811, 812, 819, 823

[56] References Cited

U.S. PATENT DOCUMENTS

| | | | |
|---|---|---|---|
| 1,138,069 | 5/1915 | Applegate | 52/445 |
| 4,054,691 | 10/1977 | McMillan | 427/290 |
| 4,067,164 | 1/1978 | McMillan | 52/309 |
| 4,240,952 | 12/1980 | Hulbert, Jr. et al. | 588/257 |
| 4,363,666 | 12/1982 | Johnson et al. | 106/711 |
| 4,741,777 | 5/1988 | Williams et al. | 106/709 |
| 4,746,365 | 5/1988 | Babcock et al. | 106/695 |
| 4,767,461 | 8/1988 | Tamura et al. | 106/638 |
| 4,861,378 | 8/1989 | Watanabe et al. | 106/719 |
| 5,108,679 | 4/1992 | Rirsch et al. | 264/118 |

FOREIGN PATENT DOCUMENTS

| | | |
|---|---|---|
| 2916335 | 8/1979 | Germany . |
| 336307 | 4/1972 | U.S.S.R. . |
| 621652 | 10/1976 | U.S.S.R. . |
| 1057461 | 4/1982 | U.S.S.R. . |

*Primary Examiner*—Anthony Green
*Attorney, Agent, or Firm*—Warren F. B. Lindsley

[57] ABSTRACT

An asbestos replacement is disclosed which includes water retention agents and finely divided mineral clays with high moisture retention capabilities. Combining the aforementioned ingredients in the correct proportions yields properties as those of asbestos when used in cementitious mortar compositions.

21 Claims, No Drawings

ASBESTOS REPLACER

TECHNICAL FIELD

This invention relates to an environmentally safe substitute for asbestos and more particularly to an asbestos replacer for use in cementitious mortar compositions.

BACKGROUND OF THE INVENTION

For over forty years, asbestos has been used in cementitious mortar formulations to improve workability and water retention. Asbestos fibers have the ability to absorb more moisture and to hold it longer than any other known natural or synthetic fillers. In addition to asbestos' ability to retain moisture, asbestos fibers also provide great plasticity and workability for cementitious mortars. Specifically, these properties allowed mortars to be easily moved through mechanical pumps and further to easily achieve a variety of finishes after application.

However, because of the dangers caused when asbestos fibers are inhaled, governing agencies in the United States and other countries have banned asbestos for many usages. The asbestos ban has left a void to be filled by a product to replace asbestos in use in cementitious mortars.

DESCRIPTION OF THE PRIOR ART

U.S. Pat. No. 1,138,069 discloses a stucco-like siding for building purposes comprising a series of composite sheets, each composed of a base of waterproof fabric, a pitchy waterproof coating thereon and a granular coating applied to the pitchy coating.

U.S. Pat. No. 4,054,691 discloses a process for promoting the adhesion of cementitious material to closed cell generally smooth skinned foam material.

U.S. Pat. No. 4,067,164 discloses composite panels for building purposes.

U.S. Pat. No. 4,240,952 teaches a composition comprising Portland cement, fly ash, sand aggregate, gypsum, latex and water.

U.S. Pat. No. 4,363,666 teaches a mortar composition comprising Portland cement, natural or synthetic fibers other than asbestos, clay, thickener, and silica.

U.S. Pat. No. 4,741,777 discloses a dry composition including Portland cement, sand, fly ash Type F, with or without glass fiber, vinyl acetate-ethylene copolymer or equivalent powder form bonding agent, sodium salts of polymerized substituted benzoid alkyl sulfonic acids, or equivalent dispersing or emulsifying agent, and defoamer or antifoam agent, which is completely dry and controlled in plant.

U.S. Pat. No. 4,746,365 discloses methods and compositions using latex emulsions for improving the performance of aluminous cement/gypsum compositions.

U.S. Pat. No. 4,767,461 teaches a method for manufacturing concrete wherein cement, water, coarse aggregate and sand are mixed together to form the concrete.

U.S. Pat. No. 5,108,679 discloses an asbestos-free cementitious composition comprising lightweight aggregate, hydraulic cement, water and reinforcing fibers in an amount not more than 4% by weight of the total composition.

German Patent Specification No. 2916335 teaches, in the abstract, a concrete mixture wherein a hydraulic cement powder is mixed with water to form a slurry. The slurry may include fine aggregate such as gravel and/or sand. The slurry may also contain fly ash, slag, pozzolan, water, glass, etc.

Soviet Union Patent Specification No. 336307 teaches, in the abstract, a concrete mix containing Portland cement, limestone rubble, porous sand filler and water.

Soviet Union Patent Specification No. 621652 teaches, in the abstract, a concrete mixture comprising Portland cement, sand, gravel and water.

Soviet Union Patent Specification No. 1057461 teaches, in the abstract, a mortar composition which comprises Portland cement, sand, ash or fly ash, and crushed fuel slag or stone siftings or burnt rock.

None of the known prior art disclose the asbestos replacer set forth herein.

SUMMARY OF THE INVENTION

In accordance with the invention claimed, an asbestos replacement is disclosed which includes hydrophilic clays and one or more thickeners, dispersants, wetting agents, mini fibers and finely divided minerals. Combining the aforementioned ingredients in the correct proportions yields high moisture retaining properties approximating those of asbestos.

The asbestos replacer is used in cementitious mortar mixtures in a percentage range based on weight of cement in the mortar mixture. The exact percentage to be used depends on the degree of plasticity and water retention desired by a user. The asbestos replacer can be added either to prepackaged dry cement mortar, to other components added to field mixed mortar or to field mixed mortars. The asbestos replacer can be added either component by component or as a pre-blended mixture.

It is the object of this invention to provide an environmentally safe substitute for asbestos that matches the workability and water retention of that material when used in cementitious mortars.

It is another object of this invention to provide a composition for use with cementitious mortars which absorbs and retains water while adding plasticity to those mortars. Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

The disclosed invention relates to an environmentally safe asbestos replacer for use in cementitious mortar compositions, specifically those compositions utilizing Portland cement mortars or Portland cement mortars combined with other cementitious components such as ground lime, alumina, silica and the like. The disclosed asbestos replacer matches the workability and, most importantly, the water retention properties of asbestos material when used in these cementitious mortar compositions.

The following describes the ingredients set forth below and the approximate ranges in weight percentages in which they may be effectively used. It should be understood that it is not necessary for all of the ingredients to be present at one time for an effective asbestos replacer formula.

Finely divided clays—may be any type or combination of types that are compatible with Portland cement mortars including but not limited to bentonite, kaolin, montmorillonite, attapulgite, fillers earth, diatomecious earth, illite, halloysite, refractory or a polyorganosilicate graft polymer or silicate. Mineral clay may be used in a range of from 0.25% to 10.00% by weight of the cement used in the mortar. Preferably clays should be able to absorb at least twice their weight of water. The higher the water absorption qualities of the filler, the less the amount that is required for the desired water retention.

In addition to the clays, the asbestos replacer composition includes from about 0.02% to 8.00% water retention agents such as thickening agents, dispersants, wetting agents, mini fibers, finely ground mineral fillers or a combination thereof. More specifically, these ingredients are described below.

Thickening Agents—may be one or a combination of a variety of hydrophilic substances used to increase the viscosity of the mixing liquids and solutions used in the mortar and to aid in maintaining stability, moisture retention and workability by their emulsifying properties.

Four classifications of thickening agents are recognized: (1) starches, gums, casun, gelatin and phycocolloids; (2) semisynthetic cellulose derivatives (hydroxyethyl cellulose, hydroxypropyl cellulose, methyl cellulose, carboxymethyl cellulose, etc.); (3) polyethylene pulp, aramid pulp polyvinyulates (synthetic); and (4) silicates, colloidal silica and acrylates.

Thickening agents may be used in a range from 0.02% to 6% by weight of the cement used in the mortar.

Thickening agents, as a part of the asbestos replacer, serve to retain moisture and add plasticity and viscosity when used in conjunction with the finely divided mineral clays or fillers used in the asbestos replacer formulation.

Dispersant—may be any type such as ionic or anionic polymers that are compatible and effective with Portland cement. Dispersants may be used in a range from 0.02% to 4.00% of the cement used in the mortar. Dispersants are plasticizers which reduce the amount of water necessary to wet out the finely divided clays and mineral fillers in the asbestos replacer and aid in dispersing the asbestos replacer into the mortar mix, thereby increasing the effectiveness of the formulation.

Wetting Agents—may be of any type such as sodium salts that are compatible and effective with Portland cement. Wetting agents help the clays and thickeners to retain water while completely wetting out the components of the asbestos replacer and cement used in the mortar.

Mini Fibers—Mini Fibers may be synthetic or natural fibers ranging up to ½" in length and are useful ingredients for the formulation in order to separate the other finely divided components. Such separation allows for easier disbursement of the components in water or the mortar mix. These mini fibers may comprise, for example, polyethylene, aramid, nylon, rayon, silk, mineral fibers and the like. In addition to mini fibers also add viscosity, strength and water retention to the cementitious mortars.

Finely divided mineral fillers—including but not limited to limestone or silica may be added to the asbestos replacer to separate the other finely divided components. The finely divided mineral fillers also increase the water retention and improve the workability of the cementitious mortars.

Other ingredients may be added to the asbestos replacer to modify the cementitious mortars for specific properties.

Retarders or accelerators may be added to increase or reduce the set time of the cementitious mortars.

Defoamer or anti foam agents may be added to control the air entrainment of the cementitious mortar during mixing.

Water reducers (plasticizers, super plasticizers) may be used to decrease the water/cement ratio in the cementitious mortar.

Preservatives may be used to control fungus growth on the hardened mortar.

Waterproofing additives may be used to increase water resistance of the cementitious mortar.

Silica fume, fly ash or other finely divided minerals with high silica content may be used as a partial substitute for Portland cement in the cementitious mortar.

Polymer resins may be used to add strength properties to the hardened mortar.

Colorants may be added to achieve a wide variety of colors.

Plasticizers—including but not limited to lime and air entraining agents may be added to increase workability of the cementitious mortar.

The above various additives may alter the aesthetics, set time, strength, viscosity, durability or workability of the cementitious mortar but contribute little if any to the purpose of the invention which is to absorb and retain water while adding plasticity, workability and open time to the mortar.

The invention is illustrated by the following examples. Throughout the following examples and the specifications unless specifically provided otherwise, parts of the disclosed asbestos replacer are given as approximately parts or percentages by weight on the cement used in a mortar mixture.

ASBESTOS REPLACER FORMULA #1

0.12% Wetting Agent—Sodium Salts
4.00% Finely divided mineral clay—Sodium Bentonite

ASBESTOS REPLACER FORMULA #2

0.12% Wetting Agent—Sodium Salts
4.00% Finely divided mineral clay—Sodium Bentonite
0.50% Dispersant—Ionic or Anionic

ASBESTOS REPLACER FORMULA #3

0.12% Wetting Agent—Sodium Salts
4.00% Finely divided mineral clay—Sodium Bentonite
0.50% Dispersant—Ionic or Anionic
0.25% Thickeners—Cellulose

ASBESTOS REPLACER FORMULA #4

0.12% Wetting Agent—Sodium Salts
4.00% Finely divided mineral clay—Sodium Bentonite
0.50% Dispersant—Ionic or Anionic
0.25% Thickeners—Cellulose
0.27% Mini Fibers—Monofilament polypropylene

ASBESTOS REPLACER FORMULA #5

0.12% Wetting Agent—Sodium Salts
4.00% Finely divided mineral clay—Sodium Bentonite
0.25% Thickeners—Cellulose

ASBESTOS REPLACER FORMULA #6

0.12% Wetting Agent—Sodium Salts
4.00% Finely divided mineral clay—Sodium Bentonite
0.25% Thickeners—Cellulose
0.27% Mini Fibers—Monofilament polypropylene

ASBESTOS REPLACER FORMULA #7

0.12% Wetting Agent—Sodium Salts
4.00% Finely divided mineral clay—Sodium Bentonite 0.27% Mini Fibers—Monofilament polypropylene

ASBESTOS REPLACER FORMULA #8

0.25% Thickener—Cellulose
4.00% Finely divided mineral clay—Sodium Bentonite

ASBESTOS REPLACER FORMULA #9

0.25% Thickener—Cellulose
4.00% Finely divided mineral clay—Sodium Bentonite
0.50% Dispersant—Ionic or Anionic polymer

ASBESTOS REPLACER FORMULA #10

0.25% Thickener—Cellulose
4.00% Finely divided mineral clay—Sodium Bentonite
0.27% Mini Fibers—Monofilament polypropylene

ASBESTOS REPLACER FORMULA #11

0.25% Thickener—Cellulose
4.00% Finely divided mineral clay—Sodium Bentonite
0.27% Mini Fibers—Monofilament polypropylene
0.50% Dispersant—Ionic or Anionic polymer

ASBESTOS REPLACER FORMULA #12

4.00% Finely divided mineral clay—Sodium Bentonite
0.27% Mini Fibers—Monofilament polypropylene
0.50% Dispersant—Ionic or Anionic polymer

ASBESTOS REPLACER FORMULA #13

4.00% Finely divided mineral clay—Sodium Bentonite
0.12% Wetting Agent—Sodium Salts
0.50% Dispersant—Ionic or Anionic polymer
0.27% Mini Fibers—Monofilament polypropylene

ASBESTOS REPLACER FORMULA #14

4.00% Finely divided mineral clay—Sodium Bentonite
0.27% Mini Fibers—Monofilament polypropylene

ASBESTOS REPLACER FORMULA #15

4.00% Finely divided mineral clay—Sodium Bentonite
4.00% Mineral Filler—Limestone The key to this invention is the utilization of the components in the correct percentages to achieve the water retention and workability and to achieve the purpose for which the cementitious mortar is being used.

The exact percentage of each ingredient and the ingredients themselves to be used depends on the plasticity, open time, workability and water retention desired by a user. The asbestos replacer can be added to either a prepackaged dry cement mortar, to field mixed mortars or to other components being added to a field mixed mortar. The asbestos replacer can be added either component by component or as a preblended mixture. Also the asbestos replacer can be added singly or as a pre-blended mixture to a concentrate which is used in the formulation of either prepackaged dry or field mixed mortars.

To substitute for asbestos in an existing formula, the asbestos replacer is preferably used at any ratio ranging from one to eight parts of replacer to one part of asbestos. Most preferably, the replacer to asbestos ratio is approximately 3 to 1.

The following are two examples of a swimming pool composition, the first using asbestos, the second using the asbestos replacer.

SWIMMING POOL PLASTER USING ASBESTOS 94 lbs. White Cement
150 lbs. Marble Aggregate
1 lb. Asbestos Fiber
Water

SWIMMING POOL PLASTER USING ASBESTOS REPLACER 94 lbs. White Cement
150 lbs. Marble Aggregate
3 lbs. Finely Divided Clay—Sodium Bentonite
0.11 lbs. Wetting Agent—Sodium Salts
0.24 lbs. Thickener—Cellulose
0.47 lbs Dispersant—Ionic or Anionic polymer
0.25 lbs. Mini Fibers—Polypropylene The combination of the wetting agent, thickeners, dispersant and fiber when added to the clay, give the product improved water retention, workability and viscosity while allowing the clays or clays and thickeners to disperse more uniformly throughout the mortar while being mixed. Various ingredients of those listed can be eliminated from the asbestos replacer for particular purpose. Each ingredient improves some aspect of the final results but the elimination or change in combination of one or two of the ingredients will not greatly decrease its usage for the purpose that it is intended as long as the clay remains in the formulation.

The following are three examples of a mortar composition using the asbestos replacer formulas discussed above:

MORTAR COMPOSITION WITH ASBESTOS REPLACER FORMULA #2

94 lbs. Cement
150 lbs. Sand
4.34 lbs. Asbestos replacer. Formula #2

MORTAR COMPOSITION WITH ASBESTOS REPLACER FORMULA #3

94 lbs. Cement
150 lbs. Sand
4.58 lbs. Asbestos replacer. Formula #3

MORTAR COMPOSITION WITH ASBESTOS REPLACER FORMULA #4

94 lbs. Cement
150 lbs. Sand
4.83 lbs. Asbestos replacer. Formula #4

It should be noted that the finely divided mineral clays by themselves are suitable for good workability and water retention, but by themselves, require much larger amounts to achieve the same viscosity and water retention.

The combination of the finely divided clay and water retention agents increase the desired properties of water retention and workability and greatly reduce the amount of clay required.

Although but one embodiment which includes the usage of clay, wetting agents, dispersants, thickeners and fibers has been illustrated and described, it will be apparent to those skilled in the art that various changes and modifications may be made therein without departing from the spirit of the invention or from the scope of the appended claims.

What is claimed is:

1. An asbestos replacer for use in Portland cement mortars consisting of:

from about 0.25% to 10.00% by weight, based on the amount of portland cement of finely divided mineral clay compatible with the Portland cement, and from about 0.02% to 8.00% by weight, based on the amount of portland cement, of water retention agents, said water retention agents being one or more of the following: thickening agent, dispersant, wetting agent, mini fiber, or finely divided mineral filler;

said thickening agent being one or more of the following: starches, gums, casein, gelatin, phycocolloids, semi-synthetic cellulose derivatives, polyethylene pulp, aramid pulp and colloidal silica.

2. The asbestos replacer of claim 1 wherein the dispersant is one or more of the following:

an ionic polymer or anionic polymer which is compatible with Portland cement.

3. The asbestos replacer of claim 1 wherein the wetting agent is one or more of the following:

a sodium salt or a modified polyacrylate compatible with Portland cement.

4. The asbestos replacer of claim 1 wherein the mini fibers are one or more of the following:

polypropylene, monofilament, glass, cellulose, polyethylene, aramid, nylon, rayon, silk or mineral fibers.

5. The asbestos replacer of claim 1 wherein the finely divided mineral fillers are one or more of the following:

limestone or silica.

6. The asbestos replacer of claim 1 wherein the finely divided clay is one or more of the following:

bentonite, kaolin, montmorillonite, attapulgite, fullers earth, diatomaceous earth, illite, halloysite, refractory, polyorganosilicate graft polymer or silicate.

7. The asbestos replacer of claim 1 consisting of in percentages by weight of the cement used in the mortar mix:

from about 0.12% of the wetting agent;
from about 4.00% of finely divided mineral clay.

8. The asbestos replacer of claim 1 consisting of in percentages by weight of the cement used in the mortar mix:

from about 0.12% of the wetting agent;
from about 4.00% of the finely divided clay;
from about 0.50% of the dispersant.

9. The asbestos replacer of claim 1 consisting of in percentages by weight of the cement used in the mortar mix:

from about 0.12% of the wetting agent; from about 4.00% of the finely divided clay;
from about 0.50% of the dispersant;
from about 0.25% of the thickening agent.

10. The asbestos replacer of claim 1 consisting of in percentage by weight of the cement used in the mortar mix:

from about 0.12% of the wetting agent;
from about 4.00% of the finely divided mineral clay;
from about 0.50% of the dispersant;
from about 0.25% of the thickener;

from about 0.27% of the mini fibers.

11. The asbestos replacer of claim 1 consisting of in percentage by weight of the cement used in the mortar mix:

from about 0.12% of the wetting agent;
from about 0.25% of the thickening agent; and
from about 4.00% of the finely divided mineral clay.

12. The asbestos replacer of claim 1 consisting of in percentage by weight of the cement used in the mortar mix:

from about 0.12% of the wetting agent;
from about 0.25% of the thickening agent;
from about 4.00% of the finely divided mineral clay;
from about 0.27% of the mini fibers.

13. The asbestos replacer of claim 1 consisting of in percentage by weight of the cement used in the mortar mix:

from about 0.12% of the wetting agent;
from about 4.00% of the finely divided mineral clay;
from about 0.27% of the mini fibers.

14. The asbestos replacer of claim 1 consisting of in percentage by weight of the cement used in the mortar mix:

from about 0.25% of the thickening agent;
from about 4.00% of the finely divided mineral clay.

15. The asbestos replacer of claim 1 consisting of in percentage by weight of the cement used in the mortar mix:

from about 0.25% of the thickening agent;
from about 4.00% of the finely divided mineral clay;
from about 0.50% of the dispersant.

16. The asbestos replacer of claim 1 consisting of in percentage by weight of the cement used in the mortar mix:

from about 0.25% of the thickening agent;
from about 4.00% of the finely divided mineral clay;
from about 0.27% of the mini fibers.

17. The asbestos replacer of claim 1 consisting of in percentage by weight of the cement used in the mortar mix:

from about 0.25% of the thickening agent;
from about 4.00% of the finely divided mineral clay;
from about 0.50% of the dispersant;
from about 0.27% of the mini fibers.

18. The asbestos replacer of claim 1 consisting of in percentage by weight of the cement used in the mortar mix:

from about 0.50% of the dispersant;
from about 4.00% of the finely divided mineral clay;
from about 0.27% of the mini fibers.

19. The asbestos replacer of claim 1 consisting of in percentage by weight of the cement used in the mortar mix:

from about 0.50% of the dispersant;
from about 4.00% of the finely divided mineral clay;
from about 0.12% of the wetting agent;
from about 0.27% of the mini fibers.

20. The asbestos replacer of claim 1 consisting of in percentage by weight of the cement used in the mortar mix:

from about 4.00% of the finely divided mineral clay;
from about 0.27% of the mini fibers.

21. The asbestos replacer of claim 1 consisting of in percentage by weight of the cement used in the mortar mix:

from about 4.00% of the finely divided mineral clay;
from about 4.00% of the mineral fillers.

* * * * *